Nov. 23, 1971   E. F. FELSTEHAUSEN   3,621,748
FOOD MOLDING MACHINE
Original Filed Dec. 1, 1966   5 Sheets-Sheet 4
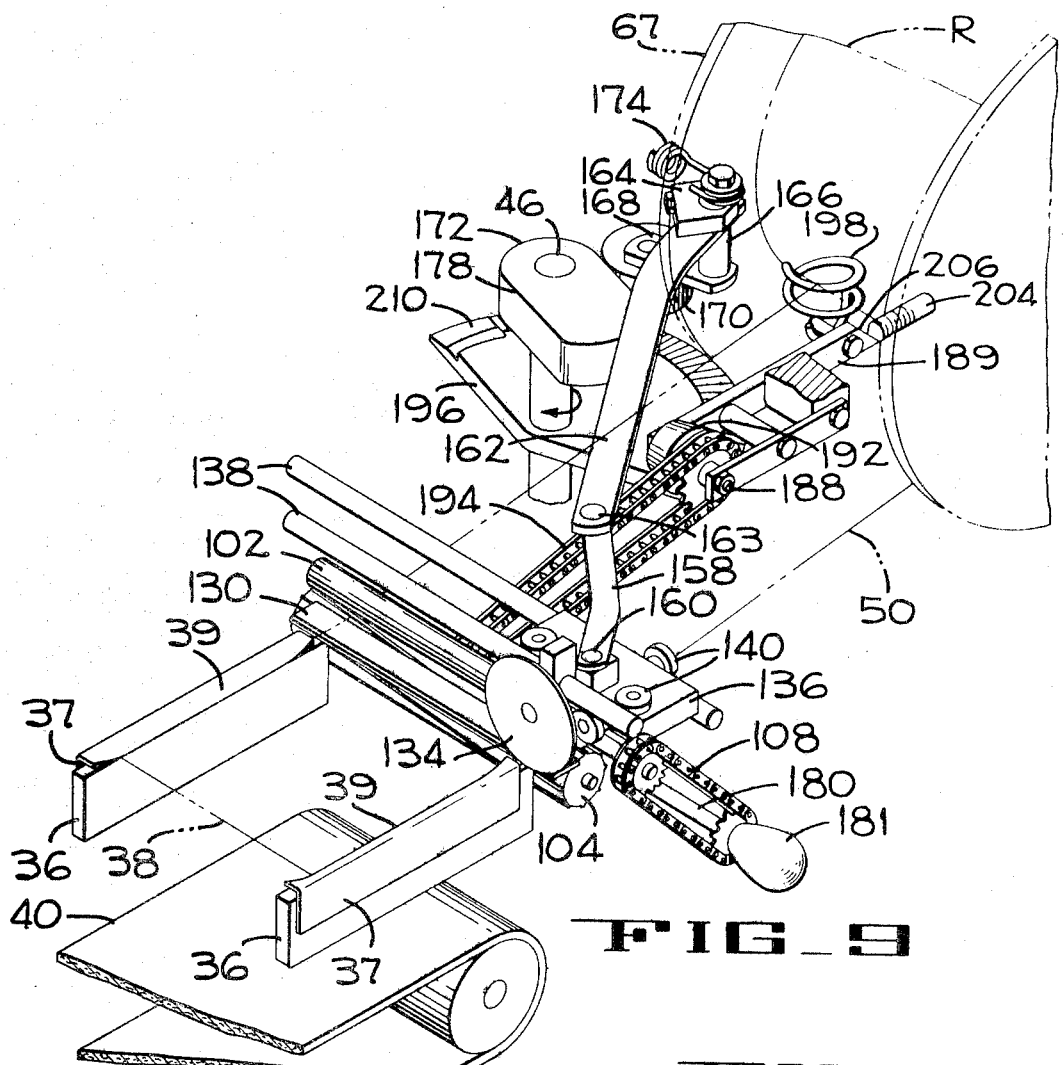
FIG_9
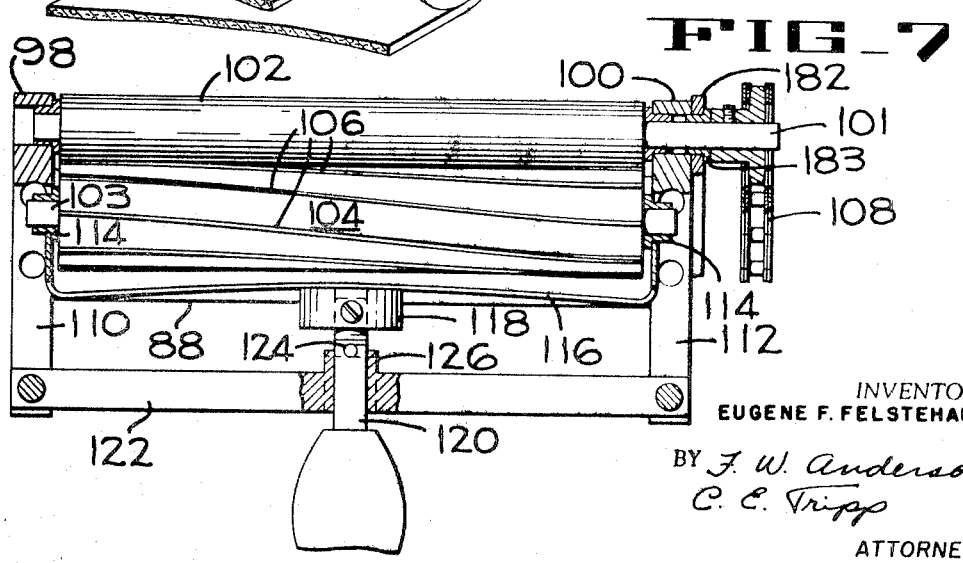
FIG_7
INVENTOR.
EUGENE F. FELSTEHAUSEN
BY F. W. Anderson
C. E. Tripp
ATTORNEYS

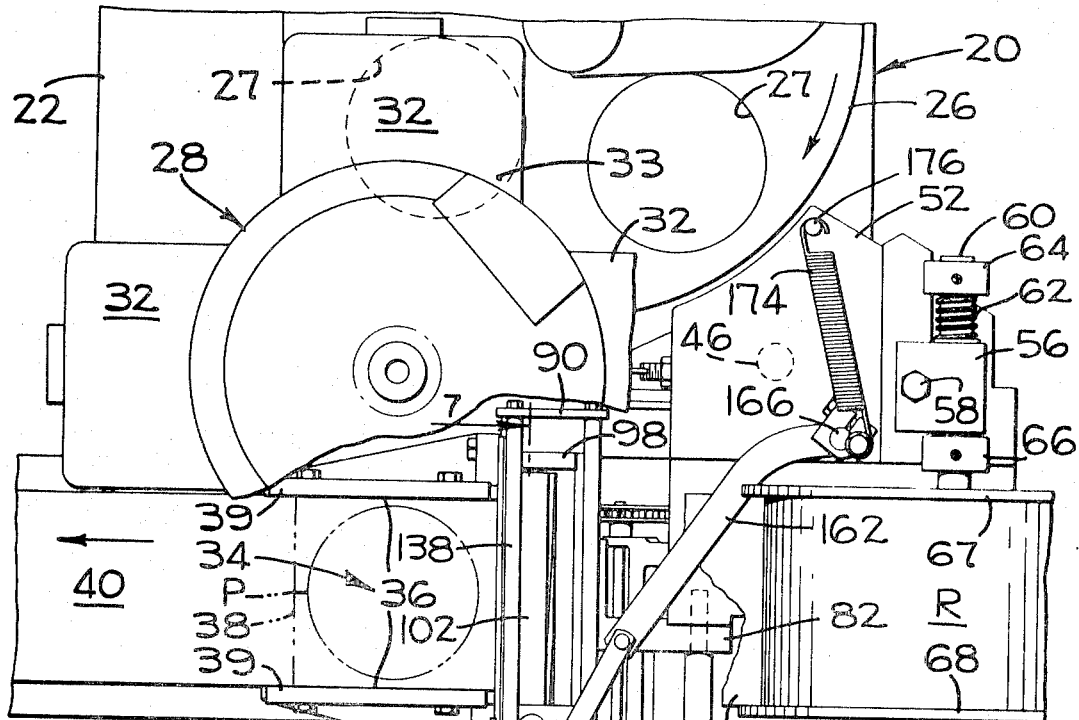
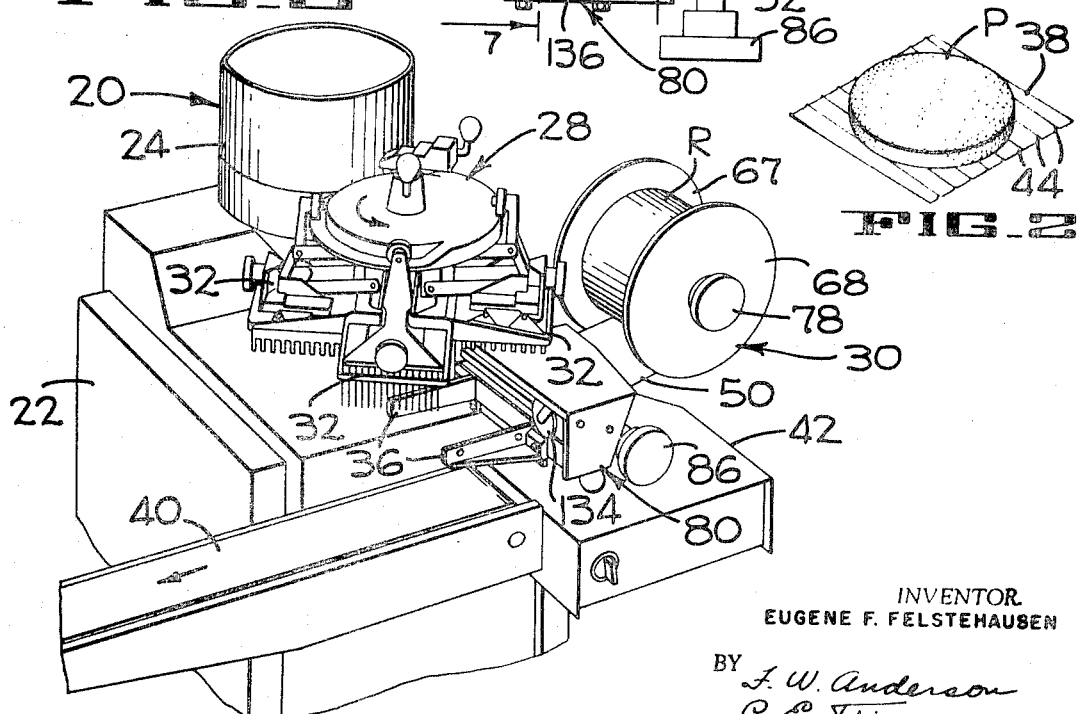

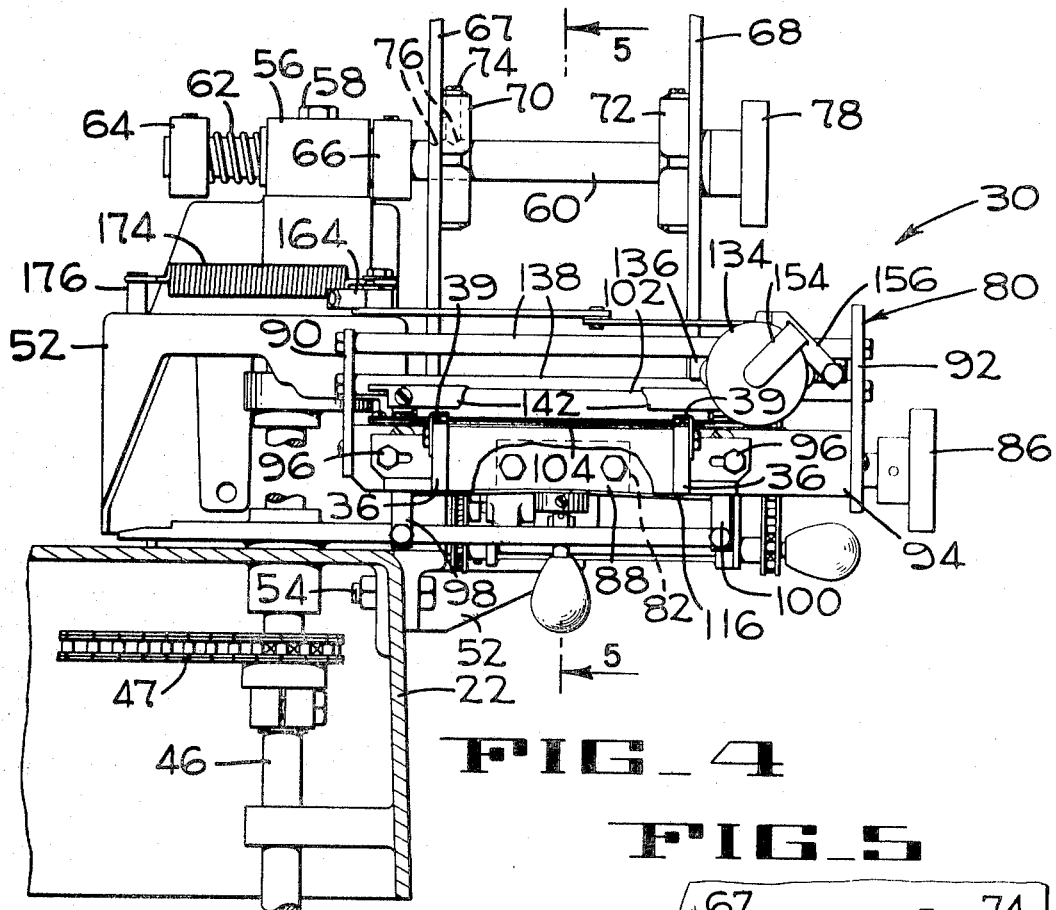
FIG_4
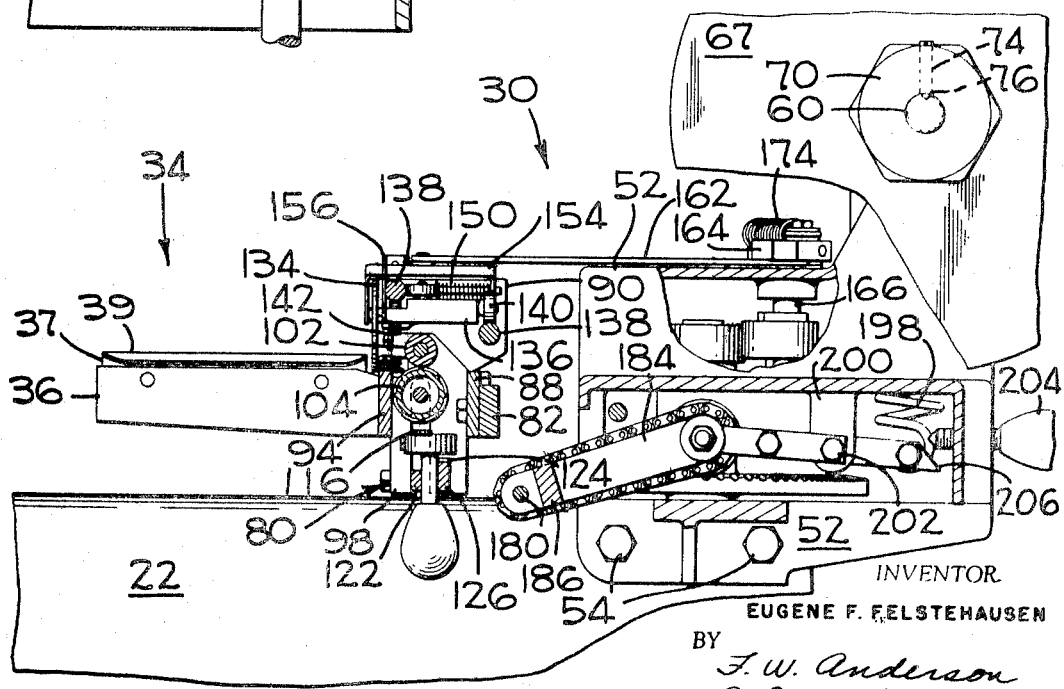
FIG_5
INVENTOR
EUGENE F. FELSTEHAUSEN
BY
F. W. Anderson
C. C. Trigg
ATTORNEYS

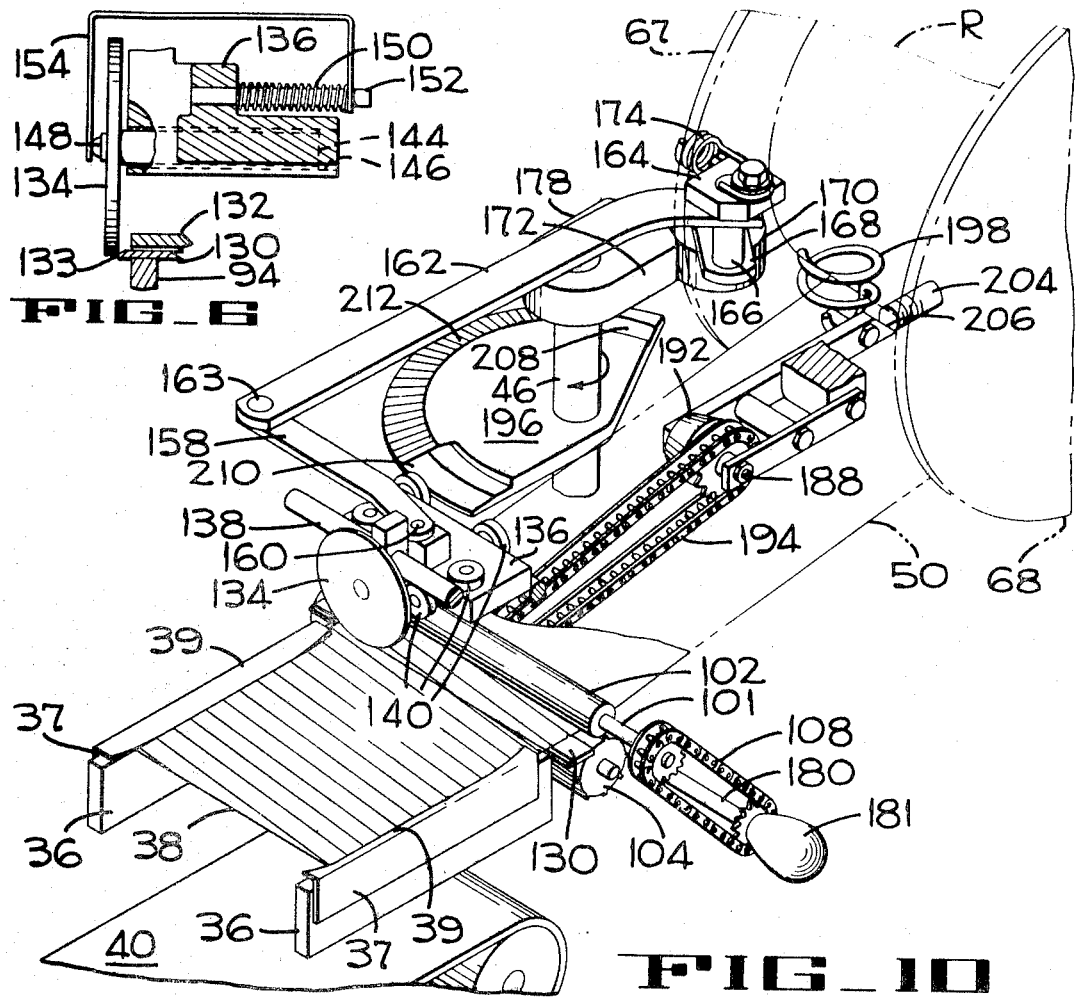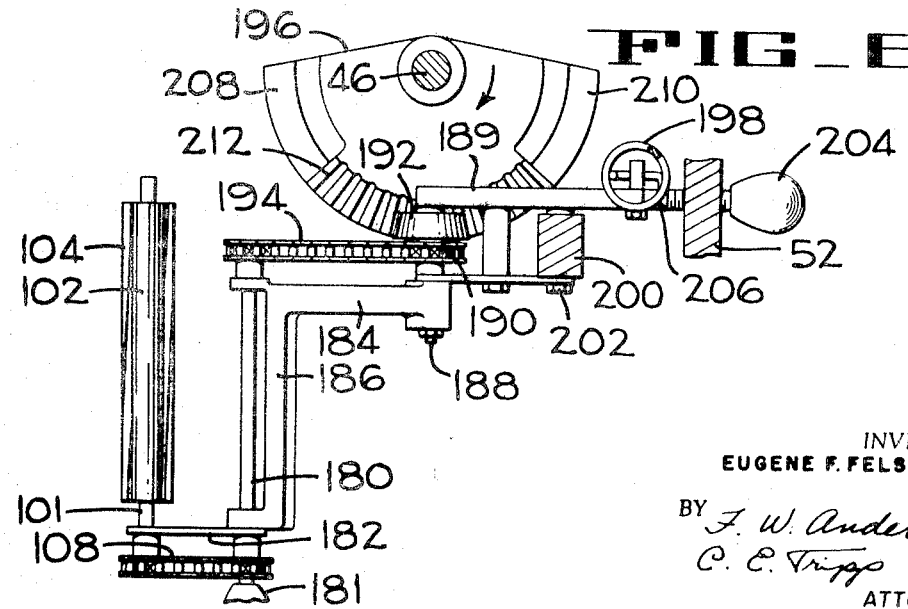

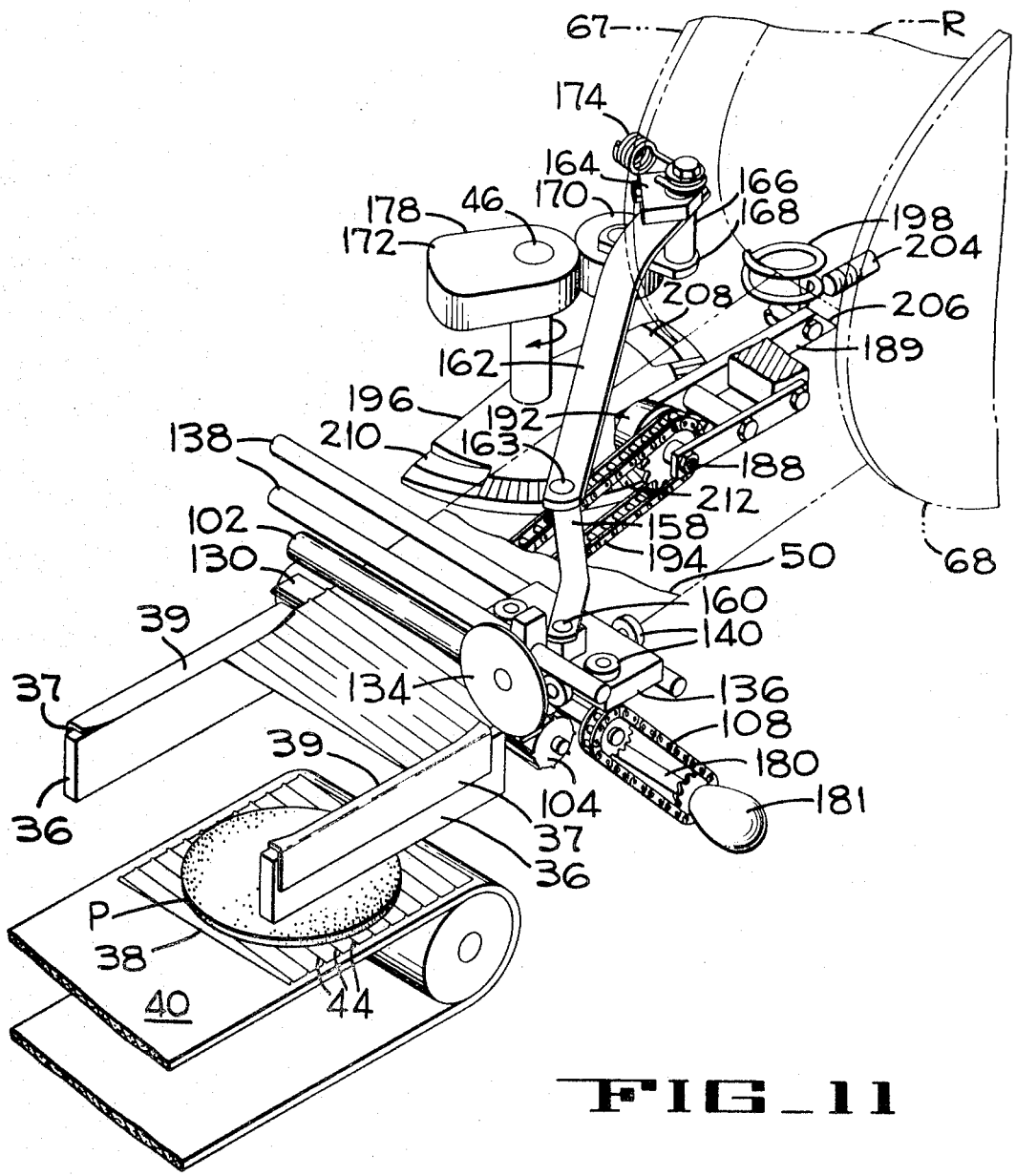
FIG_11

United States Patent Office 3,621,748
Patented Nov. 23, 1971

3,621,748
FOOD MOLDING MACHINE
Eugene F. Felstehausen, Hoopeston, Ill., assignor to FMC Corporation, San Jose, Calif.
Original application Dec. 1, 1966, Ser. No. 598,288, now Patent No. 3,461,483, dated Aug. 19, 1969. Divided and this application Mar. 24, 1969, Ser. No. 858,208
Int. Cl. B23d 19/02
U.S. Cl. 83—487                    4 Claims

ABSTRACT OF THE DISCLOSURE

The leading end portion of a rolled web of separator material, such as waxed paper, is advanced into underlying relation to the patty discharge station of a food molding machine and is severed to form a separate sheet which intercepts the patty dropped thereon so that the patties in an accumulated stack of patties are separated from one another. Under the present invention, a laterally reciprocating carriage mounts a web cutting wheel by means of a removable stub axle that is resiliently loaded from its end point. Also, the web cutter carriage is positively driven during the cutting stroke which tensions a carriage return spring, the carriage being released at the end of the cutting stroke so that the spring can rapidly restore the carriage to its initial position.

This is a division of application Ser. No. 598,288, filed Dec. 1, 1966, now Pat. 3,461,483, issued Aug. 19, 1969.

BACKGROUND OF THE INVENTION

The general field of art to which the present invention pertains is in food molding machines such as those which form uniformly shaped patties of ground meat, and specifically concerns apparatus which places a separator sheet under each patty to separate the patties in an accumulated stack of patties.

The prior art includes reciprocating sheet handling mechanisms which form separator sheets from a roll of material, such as Gause 3,177,524. According to the speed which must be maintained by the molding machine, the reciprocating sheet handling mechanism may be so slow as to limit the output of the molding machine. Another type of sheet handling apparatus is not so limited as to speed since it does not depend upon reciprocating parts, but requires the use of precut separator sheets which must be manually inserted into a magazine or holder, such as Garfunkel 2,651,430 and Richards et al. 3,126,683. The present invention constitutes improved apparatus, of the general type referred to above, in that it forms separator sheets from a variety of inexpensive materials available in bulk rolls, and embodies improved reciprocating mechanism which acts so rapidly as to not limit the output speed of the molding machine.

SUMMARY OF THE INVENTION

The present invention provides interleaving apparatus which severs individual separator sheets from a continuous rolled web of thin material such as paper, cellophane, or the like, and corrugates the material to lend it strength and to minimize contact with the articles separated by the sheets. Under the present invention, a laterally reciprocating carriage mounts a web cutting wheel by means of a removable stub axle that is resiliently loaded from its end point. Also, the web cutter carriage is positively driven during the cutting stroke which tensions a carriage return spring, the carriage being released at the end of the cutting stroke so that the spring can rapidly restore the carriage to its initial position.

In the accompanying drawings of a preferred embodiment of the invention;

FIG. 1 is a plan of a food molding machine, the interleaving apparatus of the present invention, and a takeaway conveyor, the molding machine and a conveyor being shown diagrammatically.

FIG. 2 is a perspective of a formed meat patty and its corrugated separator sheet as formed by the present invention.

FIG. 3 is a perspective showing the entire FIG. 1 apparatus.

FIG. 4 is an end elevation, partly broken away, of the interleaving apparatus.

FIG. 5 is a vertical section taken along lines 5—5 on FIG. 4.

FIG. 6 is a fragmentary section taken along lines 6—6 on FIG. 1.

FIG. 7 is a vertical section taken along lines 7—7 on FIG. 1.

FIG. 8 is a diagrammatic plan of part of the drive train which powers the interleaver apparatus.

FIGS. 9–11 are diagrammatic perspectives illustrating successive operational functions of the interleaver apparatus.

A representative type of food molding machine 20 (FIGS. 1 and 3) includes a base 22 which supports a feed hopper 24, a pocket turret 26, a transfer turret 28, and the interleaver apparatus 30 of the present invention. Ground meat is placed in the feed hopper 24 and is filled into pockets 27 of the pocket turret 26. Revolving in the direction of the arrow thereon, the pocket turret 26 moves filled pockets under the transfer turret 28. Carried by the transfer turret in a counterclockwise direction as viewed in FIG. 1, are four equally spaced pick heads 32 which at 33 (FIG. 1) successively impale the meat patties and carry and release the patties to drop by gravity at a discharge zone 34 in a substantially vertical path indicated in FIG. 1 by the phantom outline of a patty P.

The interleaver apparatus 30 is provided with two spaced sheet support arms 36 which straddle the path of the patty P and releasably support a separator sheet 38 (FIG. 2) to intercept the dropping patty. Each support arm 36 (FIGS. 4 and 5) includes a vertically adjustable guide 37 which has an inturned flange 39 that overlies the upper surface of the support arm to form therewith an inwardly open channel that embraces the adjacent edge of the separator sheet. The separator sheet is pushed downward from the support arm 36, and the patty and separator sheet drop onto a takeaway conveyor 40, or onto a previously discharged patty or stack of patties. After a counting mechanism in a control cabinet 42 (FIG. 3) has counted a predetermined number of patties into a stack, the takeaway conveyor carries the stack downstream to provide clearance for the formation of another stack. The details of the takeaway conveyor and its control mechanism are not important to the interleaver apparatus 30 of the present invention.

One feature of the interleaver 30 is that it crimps each separator sheet 38 (FIG. 2) to form slightly diagonal corrugations 44 which strengthen the sheet by providing beam-like ribs extending between the support arms 36, and which also to some extent rigidify the sheet so that it can be pushed into place on the support arms without buckling.

Before considering the interleaver 30 in detail, it should be noted that the molding machine 20 incorporates a vertical shaft 46 (FIG. 1) which is powered by a chain and sprocket drive train 47 and drives various mechanisms associated with the transfer turret 28. The shaft 46 rotates at four times the speed of the transfer turret. The same shaft 46 drives the interleaver 30, and in the time a pick head 32 advances one-quarter of a revolution to patty release position, the interleaver apparatus 30 crimps and advances the leading portion of an elongate web 50, fed from a roll R, onto the support arms 36 and severs the web before the patty is released.

Support means for the interleaver apparatus 30 comprises a downwardly open hollow casting 52 (FIGS. 1, 4 and 5) which is held by means including bolts 54 to the base 22. A pillow block 56 (FIG. 1) is secured atop the casting by a bolt 58 and rotatably supports a spool shaft 60 which carries the roll R of the web 50. One end portion of the shaft 60 extends through a spring 62 which abuts the pillow block and is held in adjustable compression by an axially adjustable set collar 64. At the other side of the pillow block, a set collar 66 is locked on the spool shaft to prevent axial drift of the spool shaft. The frictional drag created by the spring 62 serves as an adjustable brake to inhibit free rotation of the spool shaft and thus prevent overtravel of the web 50 as it is withdrawn from the roll R.

The roll R is mounted between a spool plate 67 and a spool plate 68. Integral with the spool plate 67 is a hexagonal pilot bushing 70. A similar bushing 72 is part of the spool plate 68, and the two bushings serve to support the core, not shown, of the roll R. The pilot bushing 70 is provided with a cone-point set screw 74 which can be seated in either of two conical depressions 76 (FIG. 4) in the spool 60, according to the width of the web being handled. The other bushing 72 is axially fixed on the spool shaft 60 and an internally threaded knob 78 is screwed onto the shaft.

Forwardly or downstream of the roll R, the web 50 is threaded through web advancing and severing mechanism which is indicated by the general reference number 80, and lies upstream of the sheet support arms 36. The web severing mechanism 80 is removably supported from the casting 52 by an L-shaped bracket 82 that is bolted to an outer face of the casting by an elongate rod 84 having a turning knob 86 which, as shown in FIG. 3, is accessible at the outer end portion of the severing mechanism 80 for a dismantling and cleaning procedure. The bracket 82 (FIGS 4 and 5) is botled to a transverse brace 88 which lies between upstanding end plates 90 and 92. In horizontal, downstream alignment with the brace 88, and secured to the end plates 90 and 92, is a similar brace 94 to which the sheet support arms 36 are each adjustably secured by a bolt 96 which passes through a base flange portion of the arm and is threaded into the brace 94.

Intermediate the end plates 90 and 92 (FIGS. 4 and 7) upright bearing blocks 98 and 100 are secured to the braces 88 and 94 and rotatably support the shaft 101 of a drive roller 102 and the shaft 103 of a crimping roller 104, which together cooperatively grip and advance the web 50 through the severing mechanism 80, and at the same time crease the web to form the corrugations 44 (FIG. 2). For this purpose, the driver roller 102 (FIG. 7) is provided with a resilient cover or sleeve, and the crimping roller 104 is spring-urged upward into engagement with the wed 50, which is threaded through the bight formed by the two rollers. Helically arranged on the exterior surface of the crimping roller are radially projecting ribs 106 which are spaced approximately ⅜ of an inch apart and project outward about 1/16 of an inch. The ribs 106 are helical so that they circumferentially overlap and prevent vibration of the crimping roller by continuously engaging the web 50. The drive roller shaft 101 is intermittently driven by a chain and sprocket drive train 108 which is later described.

Elongate vertical slots 110 and 112 are formed in the bearing blocks 98 and 100, respectively, for nylon, flanged bearing sleeves 114 which rotatably support the shaft 103 of the crimping roller. Means for resiliently urging the crimping roller into pressure engagement with the drive roller 102 includes a U-shaped yoke 116 which is formed of spring steel and has arcuate upper end portions, not shown, which are formed in its upright legs and are in supporting engagement with the bearing sleeves 114.

The legs of the yoke 116 are disposed in the slots 110 and 112, and the base portion of the yoke is flexed upward by a collar 118 mounted on a rod 120 which extends through a fixed cross bar 122. Beneath the collar 118 a pin 124 projects from one side of the rod 120 and, in one rotative position of the rod, seats upon a block 126 that is welded to the cross bar 122, to provide the correct flexure of the spring yoke 116. In another rotative position, the collar 118 rests upon the block 126, thus releasing the spring yoke 116 and permitting removal of the crimping roller to facilitate cleaning of the web severing mechanism 80.

In horizontal alignment with the bight formed by the drive roller 102 and the crimping roller 104 (FIGS. 5 and 6) a guide slot for the web 50 is formed between a cutter bar 130 which underlies the web, and a strap 132 which overlies the web and with the cutter bar is bolted atop the brace 94. A corner of the cutter bar 130 at 133 (FIG. 6) provides a shearing edge which coacts with a cutting wheel 134. The cutting wheel 134 is mounted on a carriage 136 which travels across the web 50 in timed relation to the intermittent rotation of the drive roller 102.

As later described in detail, the general arrangement is such that the drive roller 102 advances the leading portion of the web 50 onto the sheet support arms 36 while the carriage 136 is in its outermost FIG. 1 position, following which the web remains immobile while the carriage 136 moves across the web and return to its FIG. 1 position. During this movement of the carriage, the cutting wheel 134 and the cutter bar 130 sever the web along a line adjacent the sheet support arms 36, thus forming an individual separator sheet in position to intercept the patty which is then released by a pick head 32 at the discharge zone 34.

Guide ways for the carriage 136 (FIGS. 1, 4 and 5) include round rods 138 which extend between the end plates 90 and 92, and the carriage is provided with support and guide rollers 140 which engage the rods 138 and an L-shaped track 142 (FIGS. 4 and 5) to slidably support the carriage. As shown in FIG. 6, the cutting wheel 134 has a stub axle 144 which is axially movable in an aperture 146 of the carriage 136. Aligned with the axle and imbedded in the other side of the cutting wheel is a ball bearing 148. At the upstream side of the carriage 136, a compression spring 150 is carried by a pin 152 that projects from the carriage and extends through one leg of a U-shaped steel clip 154.

The spring 150 urges the other leg of the clip into engagement with the ball bearing 148 and thus causes the cutting wheel 134 to be resiliently urged against the shearing edge 133 of the cutter bar 130. The clip 154 passes through a slotted, fixed guide member 156 (FIG. 4) that is removably secured to the carriage 136 and keeps the clip in the described alignment. A feature of the web cutting mechanism 80 is that the cutting wheel and cutter bar are self-sharpening, and require no elaborate mechanical alignment, because of the energizing spring 150.

With particular reference to FIGS. 9–11, the knife carriage 136 is provided with a drive link 158 pivoted thereto by a pin 160. The other end of the link is pivoted to a drive arm 162, by a pin 163, which carries a clamping collar 164 (FIGS. 1, 4 and 5) that secures the drive arm to the upper portion of a rotatable cam follower shaft 166 that extends through the upper wall of the casting 52. A cam follower arm 168 on the lower end of the shaft 166 is provided with a cam follower roller 170 that rides upon the edge of a carriage-reciprocating cam 172 on the upper end of the driveshaft 46.

When the carriage 136 is moved from its FIG. 9 position to its FIG. 10 position by the carriage cam 172 the web cutting action occurs and a tension spring 174 which is connected to the clamping collar 164 and to a fixed pin 176 (FIGS. 1 and 4) is extended to provide a retracting force for the carriage. Thus, the cutting of the web 50 is positively effected by the described mechanical linkages and cam 172, and shortly after the carriage 136 attains its FIG. 10 position, the radially elongate portion 178 of the cam 172 releases the cam follower roller 170 whereby the tensioned spring 174 very rapidly returns the carriage to its FIG. 9 position.

Beginning a cycle with components arranged as illustrated in FIG. 9, the web 50, which up to this time has been idle, is advanced by the drive roller 102 and crimping roller 104 to place a preselected length of web upon the sheet support arms 36. Power for the drive roller 102 includes the chain and sprocket drive train 108 (FIG. 8) which is coupled to a cross shaft 180. A spacer link 182 extends between the cross shaft 180 and a bearing 183 (FIG. 7) on the drive roller shaft 101 to maintain the chain of the drive train 108 taut. A hand wheel 181 (FIG. 9) is threaded onto the outer end of the shaft 180 for manually rotating the drive and crimping rollers when the web 50 is initially threaded into the machine, as will be later described.

The cross shaft 180 (FIG. 8) is carried by a pivot arm 184 that is part of a frame 186 which is pivotally mounted upon an axle 188. The axle projects laterally from one end of a lever 189 and carries a freely rotatable sprocket 190 and a frusto-conical rubber friction roller 192 which are locked together for simultaneous rotation. A chain and sprocket drive train 194 couples the sprocket 190 to the cross shaft 180, and the friction roller 192 is arranged to ride upon and be driven by a segmental driving plate 196 that is secured to the driveshaft 46. Frictional engagement of the roller 192 and the driving plate 196 is effected by a tension spring 198 that is anchored within the casting 52 and is coupled to the outer end of the lever 189. A depending boss 200 of the casting 52 mounts a pivot bolt 202 that is fixed to the central portion of the lever 189, thus urging the friction roller 192 toward the driving plate 196.

The elevational position of the friction roller 192, and thus the frictional interengagement of the plate and roller, can be regulated by rotating a hand screw 204 which is threaded through a wall of the casting 52 and has a cone point which rides upon a bevelled end surface 206 of the lever 189. By rotating the hand screw 204 the lever 189 is cammed to either lift the friction roller 192 free of the driving plate 196, or to limit the degree of pressure engagement with the driving plate.

To avoid drive slippage, the driving plate 196 has bevelled outer portions corresponding to the taper of the frusto-conical roller 192, and the bevelled portions include an upwardly inclined approach ramp 208, a declining terminal ramp 210, and an intermediate, serrated portion 212 which interconnects the high ends of the ramps.

OPERATION

Assuming that the interleaving apparatus 30 (FIG. 1) is being initially set up for operation, a roll R of web material is positioned on the spool shaft 60 so that the web 50 unrolls from the bottom of the roll. If the web is wider than the web illustrated, the inner spool plate 67 (FIG. 4) is moved to its inner position adjacent the casting 52 by repositioning the set screw 74 to seat in the detent 76. By loosening the bolt 58, the spool shaft can be swung horizontally until it is perpendicular, in a horizontal plane, to the path of travel of the web 50, following which the bolt is tightened to preserve this alignment.

If the inner sheet support arm 36 is positioned as illustrated, it must be moved inward by loosening the bolt 96 so that the adjacent edge of the web is aligned with the guide slot formed by the flange 39 and the upper surface of the support arm. Next, the hand screw 204 (FIGS. 8 and 10) is threaded into the casting 52 to cam the lever 188 downward, and thus lift the friction roller 192 free of the driving plate 196. This disconnects the power train to the drive roller 102 so that clockwise manual rotation of the handwheel 181 will turn the drive roller 102 and draw the web 50 into gripped relation with the drive and crimping rollers 102 and 104, and will automatically thread the web through the slot between the strap 132 (FIG. 6) and the cutter bar 130, and into the edge guide channels formed by the flanges 39 (FIG. 9) and the upper surfaces of the support arms 36.

Next, the hand screw 204 is unthreaded to release the lever 188 so that the friction roller 192 will contact the driving plate 196. According to the axial position of the handscrew 204, the friction roller 192 can be prepositioned to engage the approach ramp 208 at any preselected elevation. When the food molding machine 20 (FIG. 1) is placed in operation to release the patties P at the discharge zone 34, the shaft 46 (FIG. 8) drives the driving plate 196, and the friction roller 192 rotates a predetermined number of revolutions (as controlled by the hand screw 204) depending upon the elevation at which the roller contacts the ramp 208. This causes the drive roller 102, beginning with the FIG. 9 position, to be rotated by the drive trains 108 and 194, and the leading end portion of the web 50 is thus crimped and advanced onto the support arms 36 as shown in FIG. 10.

Shortly after the friction roller 192 leaves the terminal ramp 210 (FIG. 9) and thus disengages the driving plate 196, the carriage cam 172 engages the follower roller 170 and swings the drive arms 162 inward. The carriage 136 is thereby moved across the web 50 as in FIG. 10, and the cutting wheel 134 and cutter bar 130 shear the web as illustrated. By the time an approaching patty (not shown) has been released, the web has been completely severed to form an individual separator sheet 38 (FIG. 2) and the falling patty pushes the separator sheet downward out of engagement with the support arms 36.

During cutting of the web 50, the carriage return spring 174 is tensioned, and subsequent to removal of the separator sheet in the manner just described, the elongate portion 178 of the carriage cam 172 passes beyond the path of movement of the cam follower roller 170, at which time the carriage return spring 174 causes the carriage to be very rapidly returned to its FIG. 11 retracted position, but before the friction roller 192 once again advances the web 50 to form the next separator sheet. Due to the rapid carriage return stroke, the leading portion of the web 50 in FIG. 11 is not only seated upon the sheet support arms 36 during the next repetitive cycle by the time the next patty arrives, but the web severing action illustrated in FIG. 10 has occurred even though the patties may be formed and discharged at speeds in the order of one per second. Stated otherwise, a 45 degree movement of the continuously rotating transfer turret 28 (FIG. 1) can occur in about one second, during which time the leading end of the web 50 is crimped, advanced into the patty receiving position, severed, and the components effecting these actions are returned to positions in which a new cycle can start.

From the preceding disclosure it is believed apparent that the present invention provides an advance over prior art devices for reasons including the following:

The web material is initially less expensive than either precut or rolled separator sheets which have previously been used because the transverse crimping of the web permits the use of thinner and less costly web materials. The rapid spring return for the carriage 136 is important in that it provides a very rapid operating cycle which assures that the interleaver apparatus 30 will not limit the output speed of the food molding machine with which it cooperates. The corrugations in the separator sheet are also useful in inhibiting sticking of the patties to the separator sheets to a marked degree because the corrugations are well defined, due to the crimping roller 104. Little attention is required for severing mechanism 80, since the cutting wheel 134 and cutter bar 130 are to a large extent self-sharpening, due in part to the spring-energized cutting wheel.

Although the best mode contemplated for carrying out the present invention has been herein shown and described, it will be apparent that modification and variation may be made without departing from what is regarded

I claim:

1. In a food molding machine which discharges successive articles to descend by gravity along a predetermined path, a frame including web supporting means straddling said path, web advancing means mounted on said frame for moving an elongate continuous web of material endwise toward said web supporting means, web cutting means mounted on said frame intermediate said web supporting means and said web advancing means for transversely severing said web, and drive means for sequentially operating said web advancing means and said web cutting means so that the web is severed after the leading end portion of the web is on said web supporting means, said web cutting means comprising a fixed cutter bar having a shearing edge extending across one side of said web, a carriage mounted for reciprocable movement across the other side of said web, a freely rotatable cutting wheel rotatably mounted in said carriage, and knife loading means for resiliently urging said cutting wheel into pressure engagement with said cutter bar; the improvement wherein said cutting wheel is mounted on a stub axle that is axially removable from said carriage and is provided with an axially outer bearing point, said resilient knife loading means including a resilient member mounted on said carriage and engaged with said bearing point to axially urge said cutting wheel toward said carriage end cutter bar.

2. In a food molding machine which discharges successive articles to descend by gravity along a predetermined path, a frame including web supporting means straddling said path, web advancing means mounted on said frame for moving an elongate continuous web of material endwise toward said web supporting means, web cutting means mounted on said frame intermediate said web supporting means and said web advancing means for transversely severing said web, and drive means for sequentially operating said web advancing means and said web cutting means so that the web is severed after the leading end portion of the web is on said web supporting means, said web cutting means comprising a fixed cutter bar having a shearing edge extending across one side of said web, a carriage mounted for reciprocable movement across the other side of said web, and a cutter mounted on said carriage, said cutter having a side sector in overlapping engagement with said shearing edge to transversely shear the web therebetween; the improvement wherein said drive means for the web cutting means includes a positive mechanical drive for moving said carriage during a web cutting stroke across the web, and a carriage return spring coupled to said carriage and tensioned thereby during said cutting stroke, said drive means releasing said carriage at the completion of said cutting stroke so that the energy stored in the tensioned spring rapidly restores the carriage to its initial position.

3. The apparatus of claim 2, wherein said positive mechanical drive for moving said knife carriage during a web cutting stroke comprises a rotating cam, a cam follower, a carriage drive arm on said cam follower, and means connecting said drive arm to said carriage.

4. The apparatus of claim 3, wherein said drive arm connecting means comprises a drive hub pivoted between said drive arm and said carriage.

References Cited
UNITED STATES PATENTS

| | | | |
|---|---|---|---|
| 2,746,545 | 5/1956 | Chamberlain | 83—508 X |
| 2,882,659 | 4/1959 | Daniels | 53—389 X |
| 3,366,442 | 8/1966 | Udall et al. | 53—221 X |
| 3,347,176 | 10/1967 | Hall | 17—32 X |

WILLIAM S. LAWSON, Primary Examiner

U.S. Cl. X.R.

53—389; 83—508, 588